June 2, 1970 J. S. BAYNARD, JR 3,515,815

RESISTANCE CONTROLLED PULSE GENERATOR

Filed Feb. 5, 1968 5 Sheets-Sheet 1

INVENTOR
J. S. BAYNARD JR.
By O. W. Marks
ATTORNEY

RESISTANCE CONTROLLED PULSE GENERATOR

United States Patent Office
3,515,815
Patented June 2, 1970

3,515,815
RESISTANCE CONTROLLED PULSE GENERATOR
Joseph S. Baynard, Jr., Burlington, N.C., assignor to Western Electric Company, Incorporated, New York, N.Y., a corporation of New York
Filed Feb. 5, 1968, Ser. No. 703,078
Int. Cl. H04m *1/28*
U.S. Cl. 179—90 7 Claims

ABSTRACT OF THE DISCLOSURE

A pulse generator includes a binary counter which is controlled by a plurality of control resistors sequentially connected to the generator. Each control resistor has a value which corresponds to one digit or letter of a sequence of digits or letters. An oscillator steps the counter which changes a variable resistance until the variable resistance establishes a predetermined relationship with the control resistor connected to the generator. The counter is reset and another control resistor connected to the generator. In one embodiment, the oscillator operates a pair of dialing contacts to produce a sequence of pulses corresponding to one digit or letter. In another embodiment, the binary counter controls the output frequencies of a dual tone generator to produce a dual tone corresponding to the digit or letter.

BACKGROUND OF THE INVENTION

Field of the invention

Data or switching systems, such as telephone systems, may be operated by serially generated pulses or one or more tones from a multiple tone generator. Each sequence of pulses of each tone or combination of tones corresponds to a digit or letter. A group of digits or letters form a word, such as a telephone number. This invention relates to an apparatus for producing a word or telephone number by the operation of a single switch.

Description of the prior art

There are a plurality of pulse generators in the prior art which automatically generate a multiple digit word upon the selection of a particular switch. However, these generators are usually characterized by their complexity, their unreliable operation, or by their inflexibility to meet the demands of the user.

SUMMARY OF THE INVENTION

An object of the present invention is a new and improved pulse generator for producing a signal indicative of a multiple digit word suitable for use in a data or switching system.

The pulse generator includes an oscillator advancing a binary counting circuit which operates a variable impedance to produce $n$ impedances corresponding to $n$ states of the counting circuit. Facilities compare the variable impedance sequentially to each of a plurality of control impedances. In one embodiment, the oscillator produces sequential output pulses which are interrupted when the varibale impedance establishes a predetermined relationship with each control impedance. In another embodiment, the counting circuit controls a tone generator to produce one output frequency or combination of frequencies from $n$ output frequencies or combinations of frequencies when the predetermined relationship between the variable impedance and control impedance is established.

DETAILED DESCRIPTION

Figure 1:
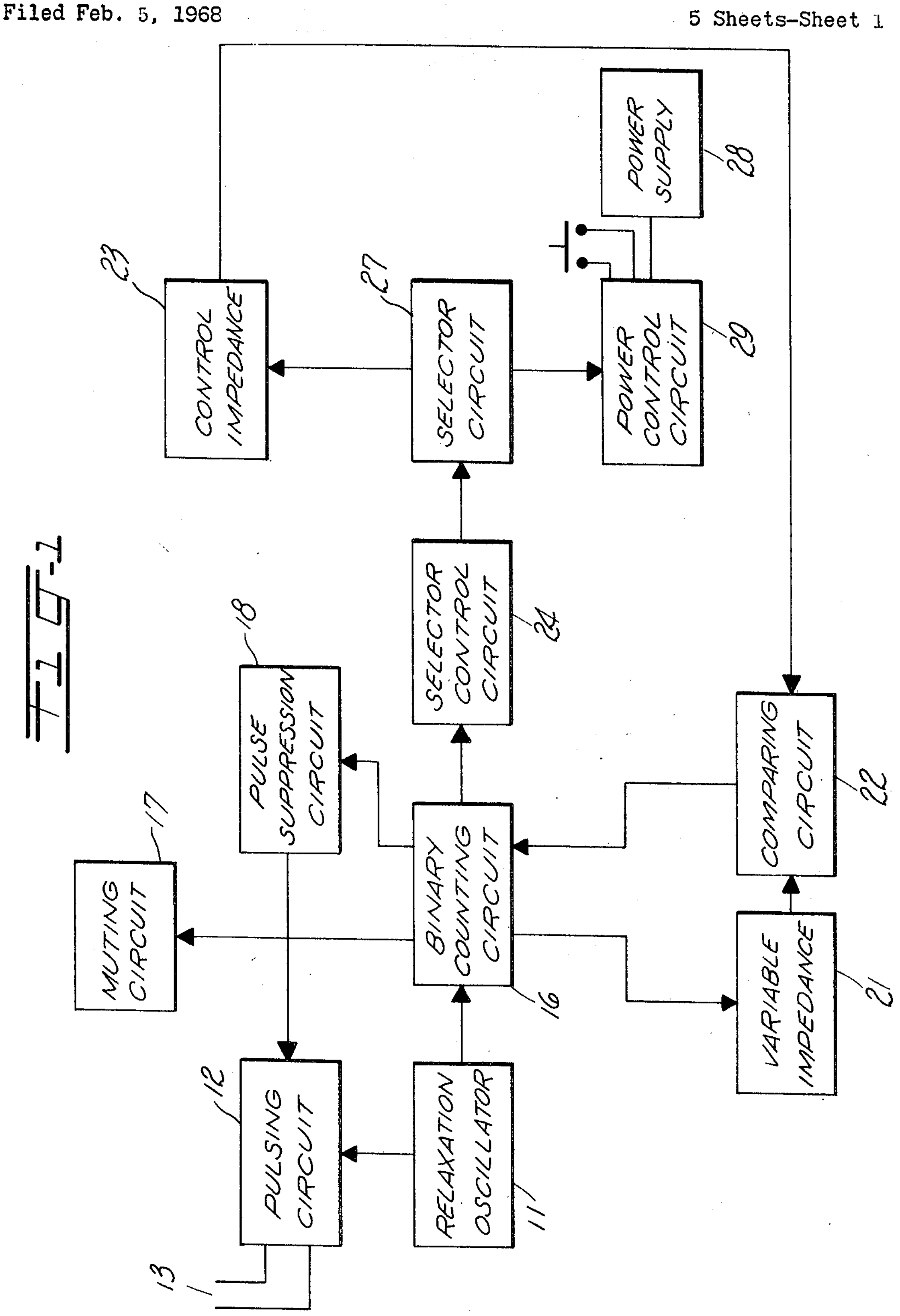
FIG. 1 is a block diagram of a pulse generator embodying the invention for producing a series of binary pulses to operate a data system or switching system, such as a telephone system.

Referring to FIG. 1, there is shown a block diagram of a circuit for producing a series of pulses on a line such as a telephone line 13. A relaxation oscillator 11 operates a pulsing circuit 12 to produce pulses on the line 13. The output of the oscillator 11 is used to step a binary counting circuit 16. At the end of the third pulse produced by the oscillator 11, the counting circuit 16 operates a muting circuit 17 to short the receiver in a telephone hand set. At the end of the fourth pulse produced by the oscillator 11, the counting circuit 16 disables a pulse suppression circuit 18 to enable the pulsing circuit 12 to send dialing pulses on the line 13. The suppression circuit 18 provides for interdigital delay between digits of a telephone number.

The counting circuit 16 operates a variable impedance 21 to change the variable impedance 21 to as many different impedances as there are states of the counting circuit 16. The variable impedance 21 and a control impedance 23 are connected to a comparing circuit 22. When the counting circuit 16 changes the variable impedance 21 such that the comparing circuit 22 senses a predetermined relationship between the variable impedance 21 and the control impedance 23, the comparing circuit 22 resets the counting circuit 16 and operates a selector control circuit 24. The selector control circuit 24 operates a selector circuit 27 which connects another control impedance to the comparing circuit 22. Power is supplied to the oscillator generator 11, the counting circuit 16, the comparing circuit 22, and the selector control circuit 24, by a D.C. power supply 28 which is connected through a power control circuit 29.

Figure 2:
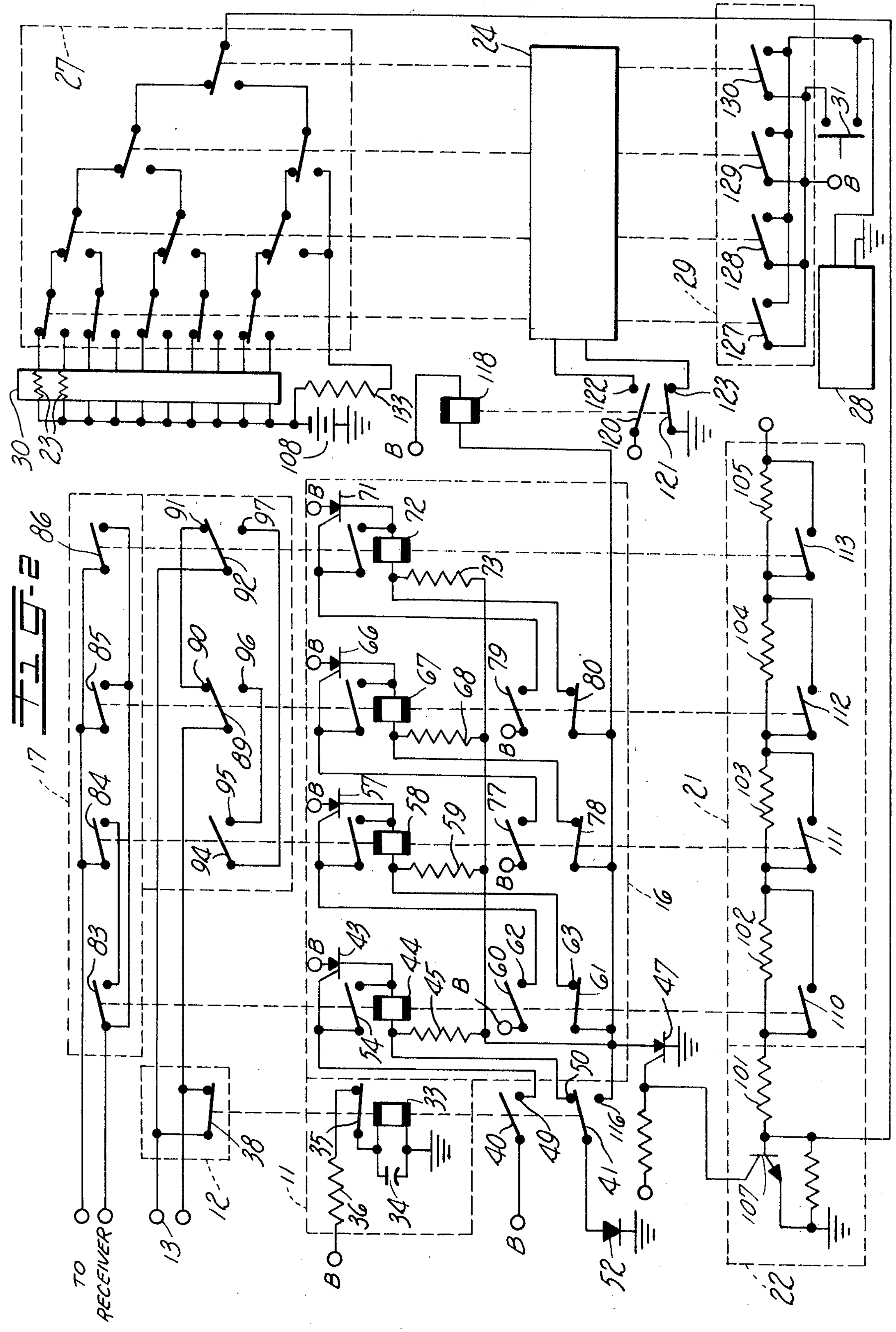
FIG. 2 is a electrical schematic showing the components of the circuit shown in FIG. 1.

Referring now to FIG. 2, the oscillator 11 has a relay 33 connected in parallel with the capacitor 34 which is serially connected by a pair of normally closed contacts 35 of the relay 33 and a resistor 36 between an output B of the power control circuit 29 and a common terminal or ground. When the power supply 28 is connected by the power control circuit 29 to the output B, current passes through the resistor 36 and normally closed contacts 35 to the capacitor 34 and relay 33. When sufficient current has charged the capacitor 34 to the actuating voltage to the relay 33, the relay 33 actuates to open contacts 35 to interrupt the current from the power terminal B. The relay 33 remains actuated until sufficient charge drains off the capacitor 34 through the relay 33 to drop the voltage across the relay 33 to less than that required to maintain the relay 33 actuated.

Contacts 38 of relay 33 are connected in series with the telephone line 13 in the pulsing circuit 12 to generate dialing pulses. The period of operation of the oscillator 11 is chosen to satisfy the requirements for dialing pulses in the telephone system. Different periods may be used in other data or switching systems.

The relay 33 of the oscillator 11 also operates contact arms 40 and 41 to actuate and deactuate the first stage in the binary counter 16. The first stage of the binary counter 16 includes a silicon controlled rectifier (SCR)

43, a relay 44, and a resistor 45, all connected serially to the power terminal B through a normally conducting SCR 47 to ground. When the relay 33 of the oscillator 11 is actuated, the contact arm 40 engages a contact 49 to connect the power terminal B to the control electrode of the SCR 43 and render the SCR 43 conductive. The value of the resistor 45 is chosen such that when the SCR 43 is conductive, the current through the relay 44 and the resistor 45 is smaller than the current required to actuate the relay 44 but greater than the holding current required to maintain the relay 44 in its actuated state. When the relay 33 of the oscillator 11 is deactuated, the contact arm 41 engages contact 50 to bypass the resistor 45 through a diode 52 to ground and to increase the current through the relay 44 sufficiently to actuate the relay 44. Normally open contacts 54 of the relay 44 are connected between the control electrode of the SCR 43 and the cathode of the SCR 43 for completing a bypass circuit from the power terminal B to the cathode of the SCR 43 when the relay 33 is actuated to engage contact arm 40 with contact 49 to change the SCR 43 from its conductive state to its nonconductive state. A subsequent deactuation of the relay 33 disengages the contact arm 40 from the contact 49 to interrupt the current through the relay 44, thus deactuating the relay 44.

A second stage of the counter 16 includes an SCR 57, a relay 58, and a resistor 59, all serially connected between the power terminal B and ground through the normally conductive SCR 47. Contact arms 60 and 61 of the relay 44 engage and disengage contacts 62 and 63 to operate the second stage of the counter in the same manner that the contact arms 40 and 41 of the relay 33 engage and disengage contacts 49 and 50 to operate the first stage of the counter. The third stage of the counter 16 includes an SCR 66, a relay 67, and a resistor 68, all serially connected between the power terminal B and the ground terminal through the SCR 47. Similarly, the fourth stage of the binary counter 16 includes an SCR 71, a relay 72, and a resistor 73, all serially connected between the power terminal B and SCR 47. Contact arms 77 and 78 of the relay 58 and contact arms 79 and 80 of the relay 67 operate the respective third and fourth stages of the counter 16 in the same manner that contact arms 40 and 41 of the relay 33 and contact arms 60 and 61 of the relay 44 operates the respective first and second stages of the counter 16.

Figure 4:
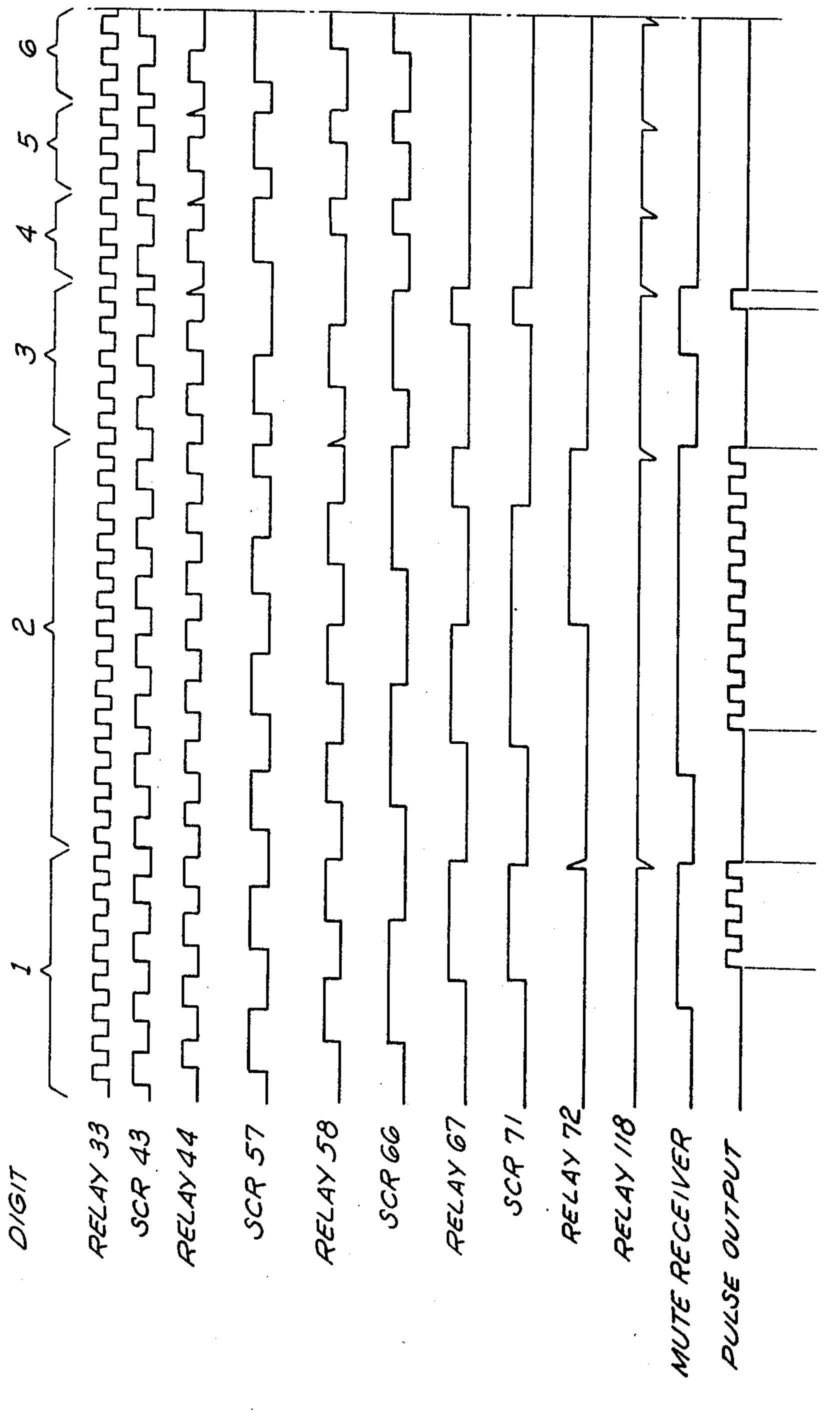
FIG. 4 is a chart showing the operation of various components of the circuit of FIG. 2 in producing a word composed of several series of binary pulses.

Referring to FIG. 4, there are shown the times of actuation of the relays 33, 44, 58, 67 and 72, and the relative times that the SCR's 43, 57, 66 and 71 are conductive in the generation of a three digit number. The raised portion of each horizontal line adjacent to each of the above-mentioned relays and SCR's indicates actuation of a relay or a conductive stage of an SCR, respectively. At the end of the third actuation of relay 33 in the oscillator 11, relays 44 and 58 are both actuated to close normally open contacts 83 (FIG. 2) of the relay 44 and normally open contacts 84 (FIG. 2) of the relay 58 in the muting circuit 17 to short out the receiver lines in a telephone hand set. At the end of the fourth actuation of relay 33, normally open contacts 85 of relay 67 are closed to short out the receiver lines. At the end of the eighth actuation of relay 33, contacts 86 of the relay 72 are closed to short out the telephone receiver. Closing of the contacts 83, 84, 85 and 86 prevents the impressing of the dialing pulses to the receiver held by the operator against his ear.

Referring to FIG. 2, the pulsing contacts 38 are shorted out by a contact arm 89 of the relay 67 engaging a contact 90 which is connected to a contact 91 engaged by a contact arm 92 of the relay 72, all of which are connected serially across the contacts 38. At the end of the fourth actuation of relay 33, the contact arm 89 disengages the contact 90 to interrupt the circuit for shorting out the contacts 38 and to enable the dial pulsing contacts 38 to begin impressing dialing pulses on the telephone line 13. The delay of four actuations of the relay 33 provides for the proper interdigital delay between respective digits of a telephone number. At the end of the fourteenth actuation of relay 33, contact arm 94 of relay 58 engages contact 95. The contact arm 94 and contact 95 are connected in series with contacts 96 and 97 which are engaged by contact arms 89 and 92, respectively, to again short the contacts 38. After the fourteenth actuation of relay 33, a digit of a telephone number is completely dialed and the shorting out of the telephone line 13 prevents further impressing of dialing pulses on the telephone line 13.

The variable impedance 21 has a plurality of resistors 102–105 serially connected between the power terminal B and a resistor 101 connected to the base of a transistor 107 in the comparing circuit 22. The base of the transistor 107 is connected through the selector circuit 27 to a resistor 23 in the resistance bank 30 which is connected to a negative power source 108. The collector of the transistor 107 is connected to the control electrode of the SCR 47. The emitter of the transistor 107 is connected to ground. Contacts 110 of the relay 44, 111 of the relay 58, 112 of the relay 67, and 113 of the relay 72, are normally open until closed by actuation of the respective relays 44, 58, 67 and 72 to short the respective resistors 102, 103, 104 and 105. The values of the resistors 102–105 are chosen such that as the counter 16 is stepped, the resistance between the base of the transistor 107 and the power terminal B is incrementally reduced. For example, the value of resistor 102 is R, the value of resistor 103 is 2R, the value of the resistor 104 is 4R and the value of the resistor 105 is 8R. Then, the resistance between the power terminal B and the base of the transistor 107 is reduced by R each time the relay 33 is actuated and deactuated.

The resistors 101–105 and a control resistor 23 act as a voltage divider to initially apply a negative voltage to the base of the transistor 107. The transistor 107 remains non-conductive until the voltage on its base becomes positive due to the decreasing resistance upon each step of the counter 16. When the transistor 107 is rendered conductive upon the operation of the appropriate stage or stages in the counter 16, the control electrode of the SCR 47 is shorted to ground. Upon a subsequent actuation of the relay 33, the contact arm 41 engages a contact 116 to bypass the SCR 47 through the diode 52 and render the SCR 47 nonconductive. Upon deactuation of relay 33, the currents through the various stages of the counter 16 are interrupted by the disengagement of contact arm 41 from contact 116 to reset the counter 16 to its initial position.

A relay 118, connected between the SCR 47 and the power terminal B is normally actuated until deactuated when the current through the SCR 47 and the bypass path of contact 116 and contact arm 41 is interrupted. Deactuation of the relay 118 operates the selector control circuit 24.

The selector control circuit 24 includes a counter which is similar to the counter 16. Contact arms 120 and 121 of relay 118 engage and disengage contacts 122 and 123 to operate the counter of selector control circuit 24 in the same manner as the contact arms 40 and 41 of relay 33 engage and disengage contacts 49 and 50 to operate the counter 16. The respective stages of the counter in the selector control circuit 24 operate a contact matrix in the selector circuit 27 to connect a selected control resistor 23 of a control resistor bank 30 in series with the negative voltage supply 108 to the base of the transistor 107.

The value of each of the control resistors 23 in the bank 30 corresponds to the value of a digit of a telephone number. The value of each control resistor 23 is selected such that the voltage on the base of the transistor 107 becomes positive when the correct number of pulses have been produced on the line 13.

Each stage of the selector control circuit 24 operates respective contacts 127, 128, 129 and 130 in the power control circuit 29. Initially, power is supplied to power terminal B by depressing start switch 31 between the power supply 28 and the terminal B. The start switch 31 must be depressed until the first digit is completed at which time the first stage of the selector circuit 24 is actuated to close contacts 127 to connect the power supply 28 to the power terminal B. Power supply 28 remains connected to power terminal B until the selector control circuit 24 has been stepped 16 times to return the counter of the circuit 24 to its original position to disable the circuit. The resistor bank 30 is shown with ten resistors 23. For the last six steps of the control circuit 24, the comparing circuit 22 is connected to the resistor 133. The value of the resistor 133 is chosen to produce a positive voltage on the base of the transistor 107 after only one or two actuations of relay 33 to reset the counter 16 and step the control circuit 24 before any dialing pulses are produced on the line 13. As shown in FIG. 4, in dialing a three digit number, the values of the fourth through the tenth resistors in the bank 30, are chosen to reset the counter 16 and step the control circuit 24 without impressing any pulses on line 13. The selector circuit 27 and resistor bank 30 may provide for the generation of more than ten digits.

Figure 3:
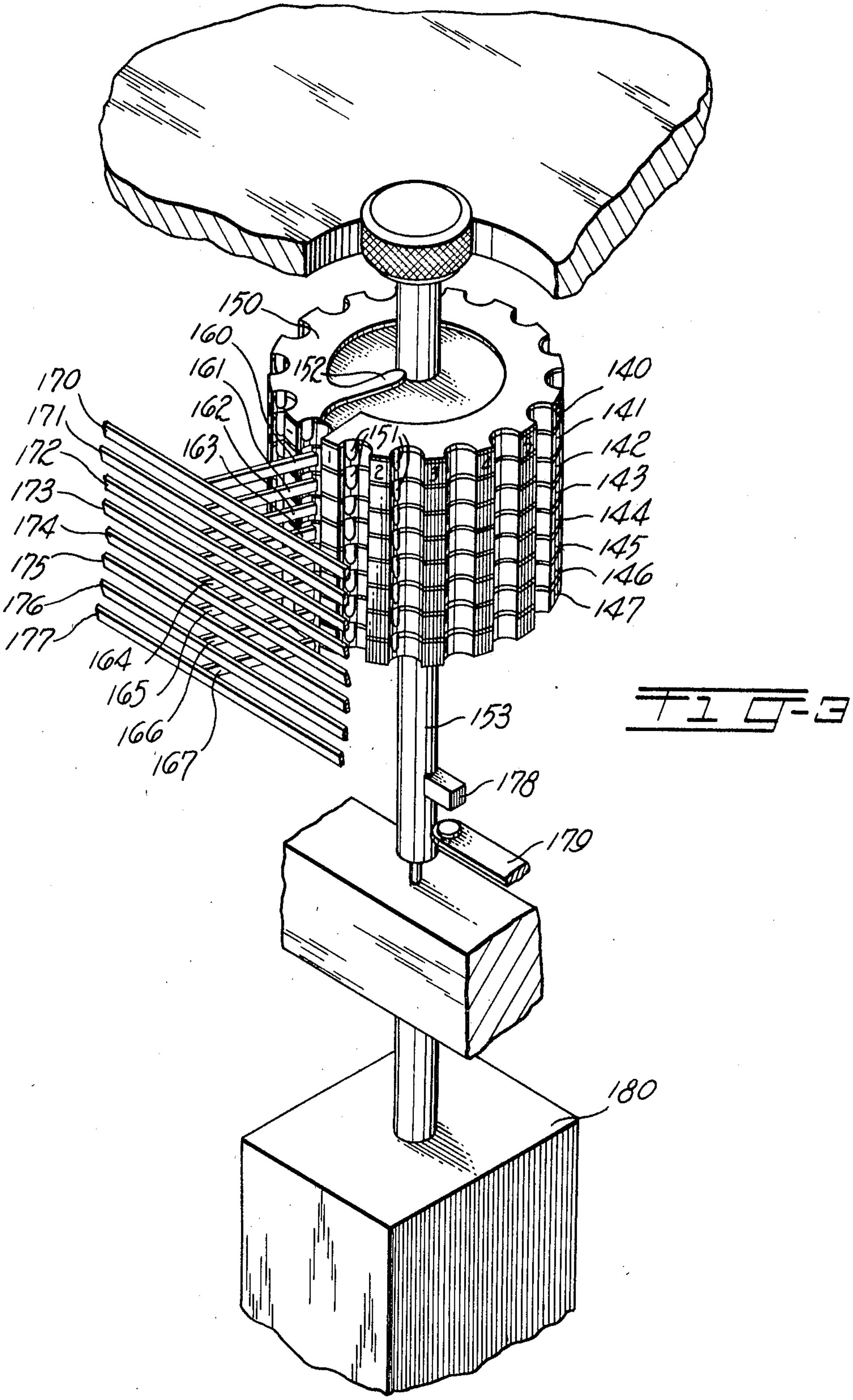
FIG. 3 shows one construction of an adjustable resistance memory bank suitable for use in the circuit of FIG. 2.

One suitable resistor memory bank may be comprised of a plurality of resistance devices such as shown in FIG. 3. Each telephone number would be set by the positioning of a plurality of dials 140–147. Each dial 140–147 has a resistance film 150 coated on one side thereof which is connected at spaced positions to connecting terminations 151 located in spaced indentations on the periphery of the dials 140–147. The resistance film 150 at one end 152 is in contact with a center rod 153 on which the dials 140–147 are mounted. Initially, the disks 140–147 are oriented such that the terminations 151 corresponding to the digits of a telephone number on the respective dials 140–147, engage respective contact arms 160–167 mounted on respective bus bars 170–177. The bus bars 170–177 are connected to the matrix of the selector circuit 27. When the rod 153 is depressed, the contact arms 160–167 engage the respective connecting terminations 151 on the respective disks 140–147 and an abutment 178 on the rod 153 engages a contact 179 connected to the negative power source 108 to connect the selected resistance device to the pulse generating circuit. A release and catch mechanism 180 is actuated by the depression of the rod 153 to hold the rod 153 in its depressed position until the selector control circuit 24 has stepped to its final position at which time the rod 153 is released to return to its original position.

Figure 5:
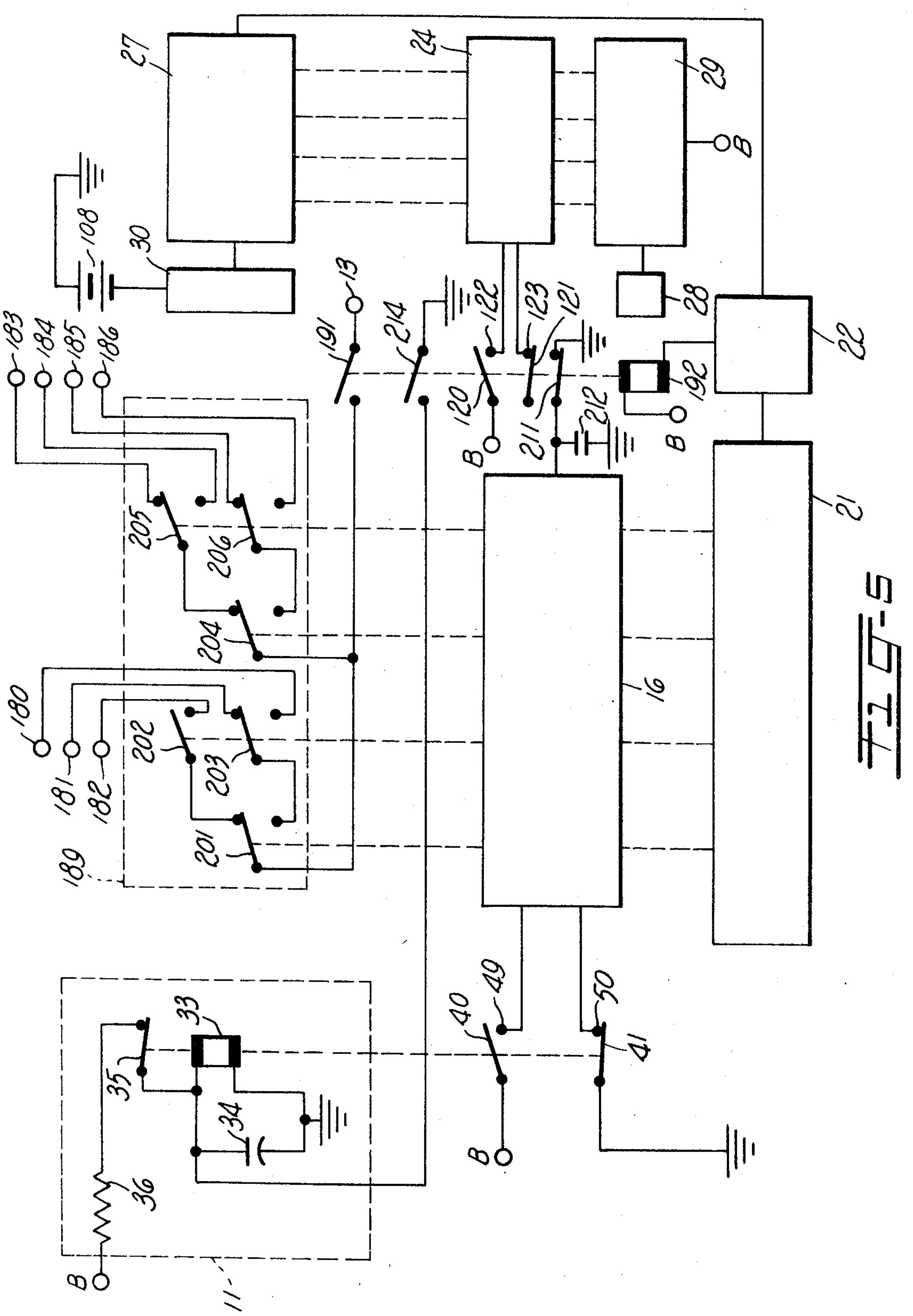
FIG. 5 shows a second embodiment of a pulse generator which is used to control a multi-frequency tone generator for producing a dual frequency tone corresponding to the desired digits of a word.

Referring to FIG. 5, there is shown a circuit for generating a multi-frequency pulse. The pulse generator produces an output signal containing two selected frequencies from seven possible frequencies. The combination of frequencies determines the particular digit represented.

Seven different frequency sources are applied to respective terminals 180–186. The relaxation oscillator 11 operates contact arms 40 and 41 to advance the counter 16 in the manner described in the previous embodiment. A switching network 189 has contact arms 201, 202 and 203 operated by the first two stages of the counter 16 to selectively connect one of the terminals 180–182 to contacts 191. Similarly, the third and fourth stages of the counter 16 operate contact arms 204, 205, and 206 to selectively connect one of the terminals 183–186 to the contacts 191. The counter 16 changes the variable resistance device 21 until the comparing circuit 22 senses that the variable resistance 21 has established a predetermined relationship with a resistance in the resistor bank 30. The comparing circuit 22 operates the relay 192 when the predetermined relationship is established to close contacts 191 and apply a tone pulse consisting of two selected frequencies to the line 13.

Operation of the relay 192 opens normally closed contacts 211 which interrupts the current flow through the various stages in the counter 16 to reset the counter. A capacitor 212 is connected across the contacts 211 to delay the resetting of the counter sufficiently to allow the chosen signal to be transmitted over the line 13. Contacts 214 of relay 192 are closed by the operation of relay 192 to bypass the capacitor 34 and relay 33 to the relaxation oscillator 11 to prevent the operation of the relaxation oscillator 11 until the counter 16 has been reset to deactuate the comparing circuit 22 and relay 192. Contact arms 120 and 121 are operated by the relay 192 to engage and disengage contacts 122 and 123 to advance the selector control circuit 4 which operates the selector circuit 27 to connect another resistance in the resistor bank 30 to the comparing circuit 22.

The generating circuit continues to cycle until the selector control circuit 24 operates the power control circuit 29 to interrupt the current from the power supply 28. If it is desired to generate less digits than there are resistances in the bank 30, the values of the extra resistances are chosen to operate the comparing circuit 22 and relay 192 when the relay 33 has been actuated and deactuated four times. When the counter has been stepped four times, the first and second stages of the counter are deactuated and the contacts 201, 202 and 203 do not make a connection to any of the terminals 180, 181 and 182. Thus, only one frequency is applied to the line 13. The central telephone exchange is not operated by a single frequency tone.

The circuit of FIG. 5 may be modified to operate a multi-frequency tone generator such as is described in U.S. Pat. 3,184,554 to L. A. Meachum and F. West and assigned to Bell Telephone Laboratories, Inc. As described in the above patent, the tone generator utilizes an oscillator controlled by a pair of tuned circuits, each containing a tapped coil and a capacitor. Connections are made between each capacitor and selected taps on the respective coils to produce the two frequencies. The switching network 189 of FIG. 5 could be modified to make the respective connections between each of the copacitors and the selected taps on the selected coils to generate the selected two out of seven frequencies.

It is to be understood that the above-described embodiments are simply illustrative of the principles of the invention and many other embodiments may be devised without departing from the scope and spirit of the invention.

What is claimed is:

1. In a circuit for controlling the number of successive output pulses generated by an oscillator:

a binary counter connected to the oscillator having at least *n* different states for counting *n* pulses;

a variable impedance;

means responsive to the counter for changing the value of the variable impedance to *n* different values corresponding to the *n* different states of the counter;

a control impedance;

means for comparing the control impedance with the variable impedance to interrupt the output of the oscillator in response to a predetermined relationship between the control impedance and the variable impedance after a number of output pulses corresponding to the control impedance.

2. In a control circuit as defined in claim 1, in which: the variable impedance is a variable resistance; and the control impedance is a fixed resistance.

3. In a generator for producing a plurality of serially coded binary signals:

an oscillator connected to output terminals for generating continuous pulses;

a binary counter connected to the oscillator for counting the pulses generated by the oscillator;

means for suppressing the application of output pulses from the oscillator until a predetermined count is reached by the binary counter;

a variable impedance;

means responsive to the counter for changing the value of the variable impedance to a plurality of values corresponding to the different counts of the counter;

a plurality of control impedances; and means for comparing the value of a first selected control impedance to the value of the variable impedance to reset the binary counter in response to a predetermined relationship between the value of the variable impedance and the value of the selected control impedance and to select a second control impedance in response to the resetting of the binary counter.

4. In a repertory dialer for opening and closing a pair of dial pulsing contacts connected to a telephone line;

a relaxation oscillator means for opening and closing the dial pulsing contacts at a predetermined rate;

a binary counter for counting the number of actuations of the oscillator means;

means responsive to the binary counter for shorting the dial pulsing contacts for a first predetermined number of the oscillator pulses;

a variable resistance;

means for changing the value of the variable resistance in accordance with different counts in the binary counter;

a plurality of control resistances, each having a value corresponding to a digit of a telephone number;

means for selecting the control resistors in a predetermined order to campare the value of the selected control resistance to the value of the variable resistance; and means responsive to a predetermined relationship existing between a selected control resistance and the variable resistance for resetting the counting circuit and for stepping the selecting means to the next control resistance.

5. In an automatic telephone dialer for impressing a series of signals on a telephone line, the combination of:

a signal line for transmitting dial impulse signals to a dial central office;

a series of memory resistors, each resistor having a resistance value representative of one of the digits of the telephone number to be dialed;

a relaxation oscillator having a pair of dial pulsing contacts arranged to alternately open and close the signal line;

a first multistage counting circuit controlled by and synchronized with the relaxation oscillator;

a control means rendered effective in accordance with the resistaance value of a first connected memory resistor for interrupting the operation of the first multistage counting circuit;

a second multistage counting circuit responsive to the interruption of the first multistage counting circuit for selectively connecting a succeeding specified memory resistor to the control means to determine the duration of operation of the first multistage counting circuit;

a plurality of relays included in and controlled by the first multistage counting circuit and having contacts for selectively placing a short circuit across the dial pulsing contacts during a predetermined number of operations of the first multistage counting circuit;

means, responsive to the interruption of operation of the first multistage counting circuit, for initiating operation of the second multistage counting circuit;

a power supply for the oscillator and counting circuits; and means, controlled by the second multistage counting circuit, for disconnecting said power supply when the second multistage counting circuit has selected the last of the memory resistors.

6. In a circuit for generating an output signal having a selected combination of at least two frequencies, comprising:

a pulse generator;

a binary counter connected to the generator for counting $n$ pulses from the generator;

variable impedance means responsive to the counter for changing to $n$ different values of impedance corresponding to the $n$ states of the counter;

normally unoperated tone generator means controlled by the binary counter for producing $n$ different combinations of frequencies, each combination containing at least two frequencies;

a control impedance; and means for comparing the control impedance with the variable impedance means to operate the tone generator means to produce a selected combination of at least two frequencies when a predetermined relationship is established between the variable impedance means and the control impedance.

7. In a circuit for generating an output signal having a selected combination of at least two frequencies, comprising:

a pulse generator;

a binary counter connected to the oscillator for counting the pulses generated by the oscillator;

variable impedance means controlled by the counter for changing to different values of impedance corresponding to different counts of the counter;

a tone generator means controlled by the counter for producing signals having different combinations of frequencies corresponding to the different counts of the counter;

a plurality of control impedances; and means for comparing a selected control impedance with the variable impedance means until a predetermined relationship is established between the selected control impedance and the variable impedance means whereat the comparing means (1) operates the tone generator to produce the output signals, (2) resets the counter, and (3) selects another control impedance.

No references cited.

KATHLEEN H. CLAFFY, Primary Examiner

T. J. D'AMICO, Assistant Examiner